June 7, 1932.  R. B. FREMONT  1,862,214

VALVE

Filed Dec. 26, 1930

INVENTOR.
Richard B. Fremont
BY Loyal J. Miller
ATTORNEYS.

Patented June 7, 1932

1,862,214

UNITED STATES PATENT OFFICE

RICHARD B. FREMONT, OF OKLAHOMA CITY, OKLAHOMA

VALVE

Application filed December 26, 1930. Serial No. 504,833.

My invention relates to valves, and more particularly to quick opening and closing, high-pressure valves.

The objects of my invention are to provide a device of this class which is new, novel, practical and of utility; which may be closed by one-fourth of one revolution of the valve stem; which, when closed, will be held in its seated position by the pressure in the flow line; which, when open, will form a smooth continuation of the flow line through the sealing plug; which may be built and designed with sufficient strength to withstand enormous line pressure; which is particularly adaptable for use in oil fields and other industries in which conveyance of a fluid is necessary which embodies sand or other gritty extraneous matter which has a tendency under pressure to cut out valves; which will not be prevented from closing by an accumulation of such extraneous substances in the valve, therefore making the valve positive in its action; which may be closed against enormous pressure by the use of a comparatively small amount of exertion or power; the movable parts of which, when worn, may be easily and quickly replaced; which may be positively lubricated; which is strong and durable; and, which will be efficient in accomplishing all the purposes for which it is intended.

Most valves, now used in high pressure lines, are so constructed that they must necessarily be cut off against the pressure in the lines and thus require an exorbitant amount of exertion to accomplish their actuation. Most valves of present use are susceptible to being cut out when used upon a flow line conveying a gritty fluid. Most of them are susceptible of being clogged by an accumulation of any gritty, fibrous, or congealable substance contained in the fluid and are thus subject to being prevented from positively seating when an attempt is made to close them. The average valve of present use, when worn, requires the replacement of its entire working mechanism and in most instances also requires a resurfacing or regrinding of the seat.

Applicant's valve is so designed that it will cut off against extremely high pressure with the use of very little power, and so that it is practically impossible for grit, sand or the like to accumulate within the valve, thus making it practically impossible for any accumulation to prevent its positively seating within the valve. Applicant's valve is also designed so that when closed, the pressure in the flow line holds the sealing plug of the valve in its seated position.

With these and other objects in view as will more fully appear, my invention consists in the construction, novel features, and combination of parts hereinafter more fully described, pointed out in the claims hereto appended, and illustrated in the accompanying one-sheet drawing, of which:

Like characters of reference designate like parts in all the figures.

Figure 1:
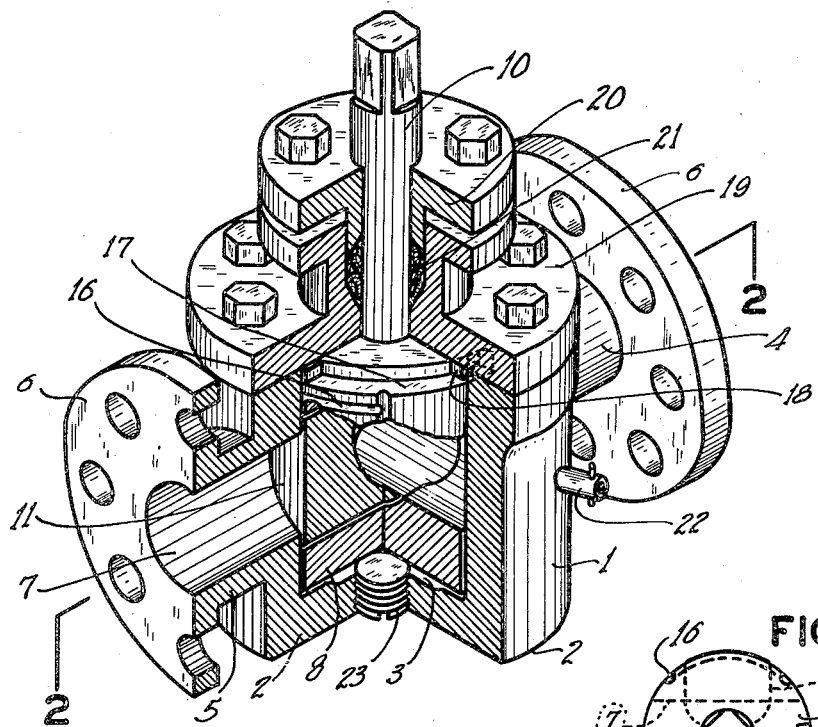
Figure 1 is a perspective view of the valve showing approximately one-fourth of it cut away, exposing the interior of the valve in a closed position.
Figure 2:
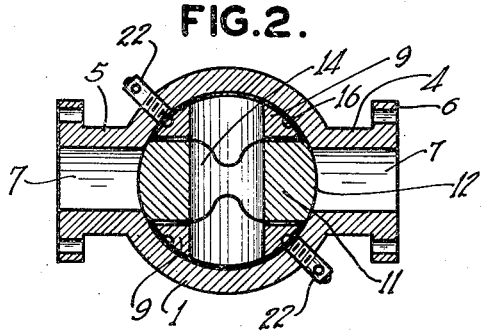
Fig. 2 is a horizontal sectional view taken along line 2—2 of Fig. 1.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawing is to be interpreted as being illustrative and not restrictive.

One practical embodiment of the invention as illustrated in the drawing comprises:

A cylindrical housing 1 having a flat bottom 2, an open upper end, and a cylindrical central bore 3. Said casting 1 is provided with outstanding cylindrical horizontal portions 4 and 5 respectively, the exterior ends of which bear flanges 6 which are adapted in a usual manner to be connected in a flow-line. Said portions 4 and 5 are each provided with an alined bore 7 each of which communicates with opposite sides of said bore 3, and together form a continuation of the flow line.

Figure 3:
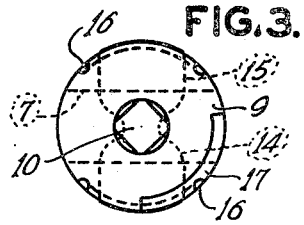
Fig. 3 is a plan view of the valve core.
Figure 4:
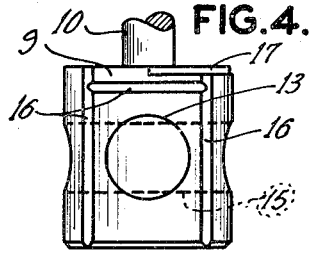
Fig. 4 is an elevational view of the valve core.

Rotatively positioned within said bore 3 with its bottom portion 8 resting upon the top of said bottom 2, is provided a cylindrical valve core 9 having an upstanding central valve stem 10 preferably integral therewith. Said core 9 may best be seen in Figs. 3 and 4. At a point above said floor 2 of housing 1 which is equal to the distance above said floor 2 at which said bore 7 is positioned, said core 9 is horizontally and transversely bored cylindrically as shown at 13 to receive a sealing plug 11. Said plug 11 in circumference is slightly larger than said bores 7 in said housing 1, and its ends are arcuately formed as shown at 12 to conform to the interior surface of said bore 3 of said casting 1. Said plug 11 is of a length substantially equal to the width of said bore 3 and is embraced by said bore 13 in said core 9 in such a manner that it may be moved slightly longitudinally of the plug by any pressure exerted in the bore 7 against either end of the plug. It may be seen that such pressure will cause the plug to be held firmly seated over the inner end of the opposite bore 7 from which the pressure is exerted, thus effectually closing said bore 7. Said plug 11 is transversely provided, preferably at a ninety degree angle with respect to said bore 13, with another bore 14 which extends entirely through the plug. Said core 9 is also provided with a bore 15 which alines with and forms a continuation of said bore 14 through plug 11. Said bores 14 and 15 are of a diameter exactly equal to the diameters of said bore 7 in said casting 1, and when the core 9 is rotated to a proper position, a continuation of said bore 7 will be formed through the core 9 and through the plug 11.

The surface of said core 9 is provided with a plurality of connected superficial oil grooves 16 which act as a means for insuring proper lubrication of the exterior of core 9 and the interior of said housing 1 therearound.

One upper edge of said core 9 is provided with a square ended guide groove 17 which co-acts with a guide lug 18 in limiting the extent to which said core may be rotated within said bore 3, and thus provides a means for insuring the registration of said bores 14 and 15 with said bores 7 when the core is at the end of its throw in one direction, and also acts as a means for insuring the positioning of the ends of said plug 11 in alinement with said bores 7 when the core is at the end of its throw in the other direction. Said lug 18 is preferably made integral with and downstands from the nether surface of a cap 19, which is secured to the top of said casting 1, and which acts as a means for completing the housing for said core 9. Said cap 19 is centrally bored to permit the protrusion therethrough of said valve stem 10, and its upper portion is equipped with a usual packing gland 20 and packing 21. The upper end of said stem 10 is angularly formed to receive a socket wrench or other means for actuating the stem rotatably. At desired intervals said housing 1 is bored transversely to receive usual oil fittings 22 which act as a means for furnishing a lubricant to said grooves 16. The bottom of said housing 1 is centrally provided with a clean out plug 23.

It is applicant's intention to provide the upper surface of said cap 19 with indicia for indicating the open and closed positions of said core 9.

The operation of the device will be obvious and it is therefore deemed unnecessary by this applicant to further describe the operation of the valve due to the fact that its operation has been, it is thought, clearly explained in the foregoing description.

Suffice to say that when the core 9 is positioned radially so as to bring said bores 14 and 15 in alinement with the bores 7, a smooth unbroken continuation of the flow-line is formed; and that there are no shoulders or protrusions presented to permit any accumulation of any extraneous or congealable matter in the fluid being conveyed through the valve; and that when said core 9 is radially positioned so as to bring said plug 11 into longitudinal alinement with said bores 7, the sealing plug acts as a positive cut-off valve for closing the flow-line. It may be seen that the device is extremely rapid in its operation, as it requires only the rotation of said core 9 in a ninety degree arc.

It will be obvious, that if it is found desirable, that said bottom 8 of said core 9 could be provided with another valve stem 10 extending through the bottom 2 of said housing 1 and that another cap and packing gland could be provided for this stem without departing from the spirit or principle of the invention.

Obviously, the invention is susceptible of embodiment in forms other than that which is illustrated in the accompanying drawing and described herein, and applicable for uses and purposes other than as detailed, and I therefore consider as my own all such modifications and adaptations and other uses of the form of the device herein described as fairly fall within the scope of my invention.

Having thus described my invention, what is claimed and desired to be secured by Letters Patent, is:

1. A valve, embodying a cylindrical housing having a transverse bore and a closed bottom, said housing adapted to be attached within a flow line so that said bore forms a continuation of said line, a core rotatably disposed snugly within said housing, said core having a first transverse bore of a diameter equal to that of said transverse bore in said housing and adapted to form a continuation thereof when said core is in a desired radial position, said core also having a second transverse bore slightly larger in diameter than said first bore therein and intercepting said first bore, a solid sealing plug slidable longitudinally within said second bore, said plug having a transverse through bore adapted to form a continuation of said first bore, said plug adapted to close the bore in said housing when the core is positioned radially to bring said plug in longitudinal alinement with the bore in said housing, a closure for said housing, and means for partially rotating said core from the exterior of said housing.

2. A valve, embodying a cylindrical housing having a transverse bore and a closed bottom, said housing adapted to be attached within a flow line so that said bore forms a continuation of said line, a core rotatably disposed snugly within said housing, said core having a first transverse bore of a diameter equal to that of said transverse bore in said housing, and adapted to form a continuation thereof when said core is in a desired radial position, said core also having a second transverse bore slightly larger in diameter than said first bore, a solid sealing plug slidable longitudinally within said second bore, said plug having a transverse through bore adapted to form a continuation of said first bore, said plug adapted to close the bore in said housing when the core is positioned radially to bring said plug in longitudinal alinement with the bore in said housing, a closure for said housing, means for partially rotating said core from the exterior of said housing, and means for limiting rotation of said core.

3. Organization as described in claim 2, in which said core is provided with exterior lubricating grooves, and the housing is provided with means for introducing a lubricant to said grooves.

4. Organization as described in claim 2, in which said rotation limiting means comprises an abrupt ended arcuate groove in the top of said core, and a lug extending into said groove and depending from the nether surface of said closure.

5. A valve, embodying a housing having a longitudinal bore and a smaller transverse bore intercepting said longitudinal bore, a valve core having two transverse through bores intercepting each other centrally of said core, one of said last named bores being slightly larger in diameter than the other, the smaller being of the same diameter as said first named transverse bore, said core being rotatably disposed snugly within said housing so that the bores in said core will register alternately with the transverse bore in said housing when said core is rotated to suitable positions, a solid sealing plug disposed snugly and slidably in the larger of the bores in said core, said plug having a transverse through bore adapted to form a continuation of the smaller bore in said core, a closure for the top of said housing, and means for partially rotating said core from the exterior of said housing.

6. Organization as described in claim 5, and means for limiting the rotation of said core.

7. In a valve, the combination with a housing having a flow-hole through its body and having a central cylindrical cavity intercepting said flow-hole, of a valve core rotatably disposed snugly within said cavity, said core having a first transverse bore of a diameter equal to that of said flow hole and adapted to form a continuation thereof when said core is in a desired radial position, said core also having a second transverse bore slightly larger in diameter than and intercepting said first bore at an angle of approximately ninety degrees, a solid cylindrical sealing plug snugly and slidably disposed longitudinally within said second bore, its ends formed to conform to the walls of said cavity, said plug having a transverse through bore adapted to form a continuation of said first bore, said plug adapted to close said flow-hole when said core is radially positioned to bring said plug into longitudinal alinement with the flow-hole, a closure for said housing, and means for partially rotating said core from the exterior of said housing.

8. In a valve, the combination with a housing having a flow-hole through its body and having a central cylindrical cavity intercepting said flow-hole, of a valve core rotatably disposed snugly within said cavity, said core having a first transverse bore of a diameter equal to that of said flow-hole and adapted to form a continuation thereof when said core is in a desired radial position, said core also having a second transverse bore slightly larger in diameter than and intercepting said first bore at an angle of approximately ninety degrees, a solid cylindrical sealing plug snugly and slidably disposed longitudinally within said second bore, its ends formed to conform to the walls of said cavity, said plug having a transverse through bore adapted to form a continuation of said first bore, said plug adapted to close said flow-hole when said core is radially positioned to bring said plug into longitudinal alinement with the flow-hole, a closure for said housing, means for partially rotating said core from the exterior of said housing, and means for limiting the rotation of said core.

RICHARD B. FREMONT.